United States Patent
Lehle

[11] 3,892,941
[45] July 1, 1975

[54] HEATING TIMER FOR PULSE WELDERS

[76] Inventor: Erhard Lehle, Breite Strasse 21, 7031 Gartringen, Germany

[22] Filed: Oct. 9, 1973

[21] Appl. No.: 404,703

Related U.S. Application Data

[63] Continuation of Ser. No. 210,978, Dec. 22, 1971, abandoned.

[30] Foreign Application Priority Data
Dec. 23, 1970  Germany............................ 2063459

[52] U.S. Cl. ..................... 219/113; 219/112; 320/1
[51] Int. Cl. ............................................... B23k 9/10
[58] Field of Search ........................... 219/108–114, 219/137, 131 R, 131 WR; 320/1

[56] References Cited
UNITED STATES PATENTS

| | | |
|---|---|---|
| 3,141,950 | 7/1964 | Chiasson............................... 219/89 |
| 3,406,324 | 10/1968 | Ayers...................................... 320/1 |
| 3,423,558 | 1/1969 | Brennen........................... 219/113 X |
| 3,519,787 | 7/1970 | Kroy.................................. 219/112 X |
| 3,644,699 | 2/1972 | Mescheryak et al................. 219/113 |
| 3,763,343 | 10/1973 | Rocklin.................................. 219/76 |

*Primary Examiner*—C. L. Albritton
*Assistant Examiner*—G. R. Peterson
*Attorney, Agent, or Firm*—Arthur Schwartz; David A. Blumenthal

[57] ABSTRACT

An apparatus for the timing of the pulse length in the heat supply to the jaws of a pulse welder, where a capacitor is adjusted to have charging and discharging rates which are analogous to the heating rate and cooling rate of the welder jaws, thereby permitting the adjustment and maintenance of a given welding temperature in spite of an irregular pulse sequence and/or changes in the potential of the power supply.

7 Claims, 2 Drawing Figures

HEATING TIMER FOR PULSE WELDERS

This is a continuation, of application Ser. No. 210,978, filed Dec. 22, 1971 now abandoned.

BACKGROUND OF THE INVENTION

1. Field of the Invention

The invention relates to timing devices, and in particular to devices for the electronic timing of the heat supply pulse in pulse welding machines which are used for welding and sealing of thermoplastic web material.

2. Description of the Prior Art

The welding of plastic foil or the heat-sealing of plastic-lined paper webs requires that the surface areas to be fused must be heated to the temperature at which such a fusion can take place. In a continuously operating process this result can be obtained by means of heater rollers. For example, for intermittent operations one uses heated metal jaws which in most cases are covered by a skin of polytetrafluor-ethylene which prevents the plastic foil from sticking to the hot jaws. The heat supply for the heating of the jaws or plates of the welder is obtained, apart from several other methods, by an electric resistance in the form of a heater band which is rapidly heated under a current pulse and which cools quickly thereafter. This effect can be intensified by the provision of special cooling means.

In the intermittent operation of a packaging machine the quality of the weld remains consistent only as long as the time intervals between welding cycles remains exactly the same, once the length of the current pulses has been adjusted to the particular gauge and material of the foil to be welded. Such an adjustment of the length of the heating pulse can take into account only one given pulse sequence. The required pulse is shorter when the succession of cycles is rapid and residual heat remains in the jaws, or is longer when in a slow operation the jaws cool almost completely. Thus, the adjustment requires guess-work and trial-and-error operation. In the case of irregular intervals between welding cycles it was not possible, heretofore, with existing equipment, to make the appropriate adjustments during operation, with the result that unusuable welds were obtained, either from insufficient fusion due to underheating, or from melting away of the foil due to overheating.

SUMMARY OF THE INVENTION

It is a primary objective of the invention to eliminate the above-mentioned shortcomings by proposing a heating timer which automatically adjusts the length of the heating pulses in relation to the time interval between welding cycles and which also compensates for variations in the voltage of the electric power supply which may also cause irregularities in the quality of the weld.

The invention, in order to attain the above objective, takes advantage of the discovery that the temperature curve of a body which is heated with a constant energy input follows approximately as exponential function within the relevant temperature range. A similar exponential time function is obtained in the voltage of a capacitor which is charged through a resistance, the charge potential increasing along a curve similar to that of the jaw temperature.

When the operating conditions in a process call for the heating of a body to a certain predetermined temperature, it is necessary to interrupt the energy input as soon as this temperature is attained. Analogously, when a capacitor is to be charged to a predetermined potential, it is necessary to interrupt the charging operation as soon as the given voltage is attained.

Likewise, an approximately exponential function characterizes the cooling of the heated body, although in most cases with a time constant which is different from that obtained during heating. The latter, of course, is determined by the amount of energy input. The capacitor, when being discharged through a resistance, operates again in an analogy to the heated body. Hence, with correspondingly adjusted time constants, the capacitor potential represents at all times a measure of the prevailing welding jaw temperature.

The exploitation of this discovery in the heating timer for pulse weldlers proposes by the invention thus involves the use of an electronic timing circuits in which the temperature changes in the welding jaws are analogously reproduced as voltage changes on a capacitor with suitable charge and discharge resistances, whereby the supply of heating current to the welding jaws and the supply of a charging potential to the capacitor are both maintained by means of a switching element until a trigger, which becomes operative at a predetermined capacitor voltage, blocks the switching element which opens again only after the connection to the power supply has been cut at the ent of the welding cycle.

In the next welding cycle, when the welder is again operated to close its jaws, the heater wire or heater band is reconnected to the power supply and the timing circuit is simultaneously closed, thereby recharging the capacitor via a charging resistance which is adjusted for a time constant corresponding to the temperature rise in the heated jaws. As soon as the capacitor voltage reaches a predetermined, adjustable value which corresponds to the desired temperature on the welding jaws, it activates the trigger which blocks the switching element, which in turn cuts off both the energy supply to the heater wire and the charging circuit of the capacitor. From this point on the welding jaws undergo cooling, while the capacitor discharges via a discharging resistance which reproduces the time constant of the temperature drop in the welding jaws. This sequence is repeated in each welding cycle, depending upon the time elapsing between welding cycles, the welding jaws will have retained a larger or smaller amount of residual heat and the capacitor will similarly still have a correspondingly higher or lower residual potential at the moment when the next charging and heating pulse is initiated. Thus, the threshold voltage on the trigger will be attained after a correspondingly shorter or longer charging/heating pulse.

The invention further proposes a simple way of compensating for variations in the voltage of the power supply. This is by keeping the threshold voltage of the trigger at a constant level while the capacitor is charged with a potential that varies in proportion to the variations in the power supply voltage.

BRIEF DESCRIPTION OF THE DRAWING

Further special features and advantages of the invention will become apparent from the description following below, when taken together with the accompanying drawings which illustrate, by way of an example, an embodiment of the invention, represented in the various figures as follows.

DESCRIPTION OF THE PREFERRED EMBODIMENT

Figure 1:
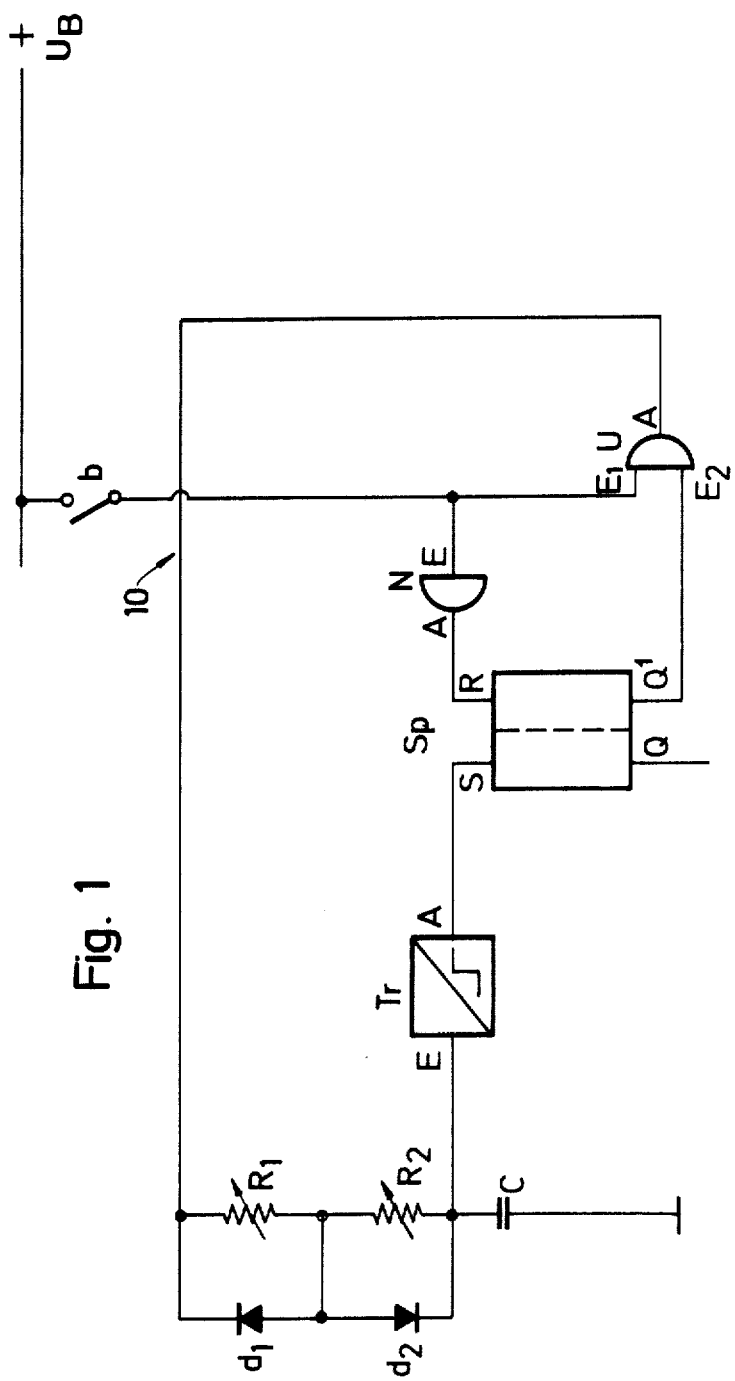
FIG. 1 represents a logic diagram, where the control elements of the timer of the invention are indicated by way of logic symbols.

According to FIG. 1, the heating timer of the invention includes an electronic circuit 10 which can be connected to a current supply of the potential $U_B$ by means of a switch $b$. The switch b may be operatively connected with the main switch (not shown) which starts the welding cycle of the welding jaws, or it may respond to a contact which is created when the welding jaws are pressed against one another. In the non-operative position of the switch b the accumulator Sp is empty, because a NOT or inverter circuit N sends a signal from its exit A to the eraseentry R of the accumulator $S_p$. In this situation the capacitor C is discharged over an adjustable discharge resistance $R_2$, a diode $d_1$, and the exit A of the AND gate U.

The actuation of the switch $b$ causes a signal to appear at the exit A of the AND gate U so that the capacitor C is charged over a charging resistance $R_1$ and a diode $d_2$. When a predetermined potential is attained at the capacitor, this potential is also present at the entry E of a trigger (threshold switch) Tr. This particular voltage actuates the trigger, and the signal which appears at the exit A of the trigger resets the accumulator Sp. Because the signal from the exit $Q^1$ of the accumulator Sp to the second entry $E_2$ of the AND gate is now no longer present, the signal from the exit A of the AND gate also ceases. In this condition of the circuit, the capacitor C is discharged over the resistance $R_2$ and the diode $d_1$.

In order to compensate for variations in the supply voltage $U_B$, the threshold voltage of the trigger Tr is held constant, while the timer logic is supplied with a voltage which is proportional to the supply voltage $U_B$.

Figure 2:
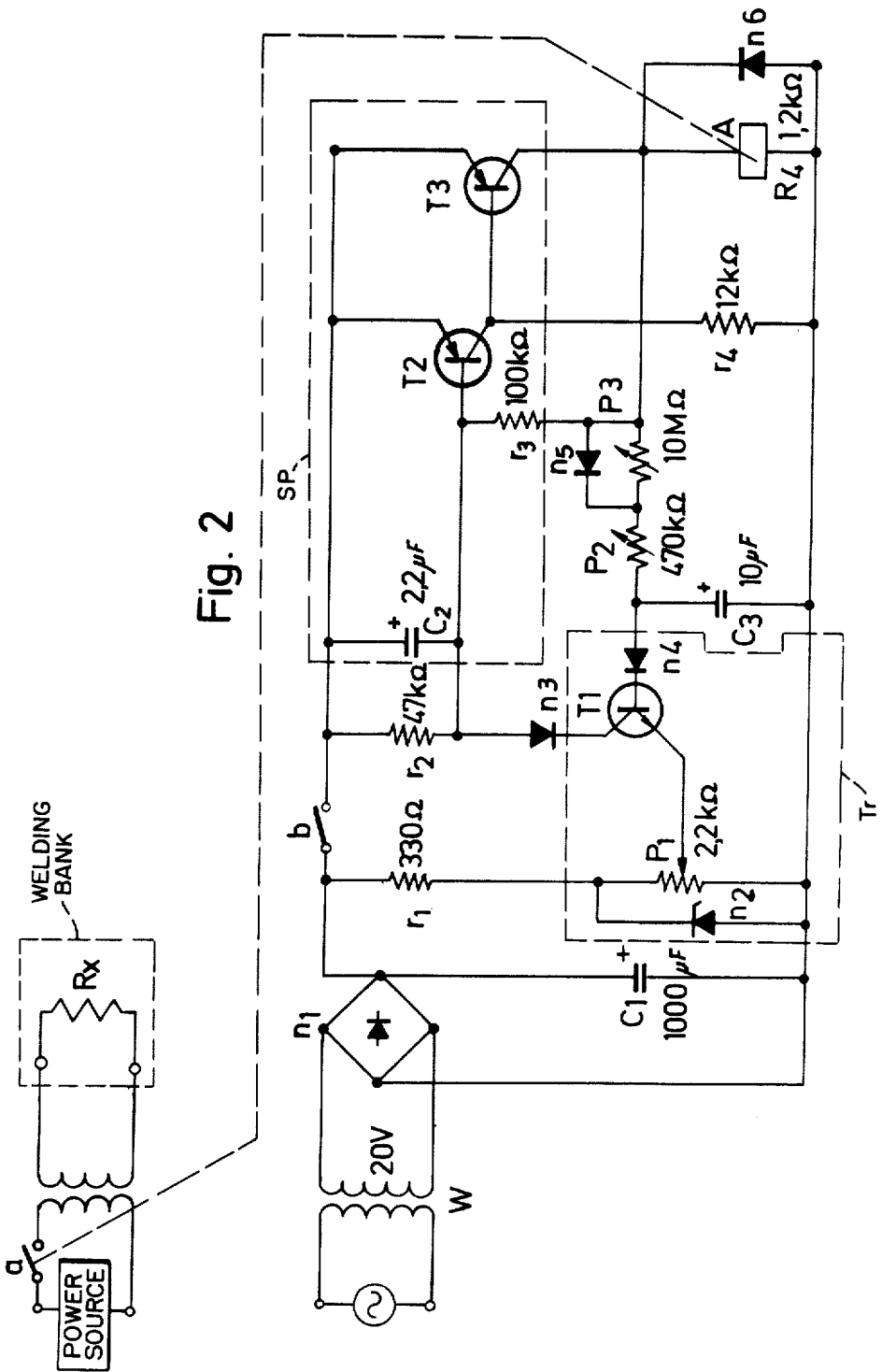
FIG. 2 shows an actual circuitry diagram for a timer containing the logic of FIG. 1.

In the embodiment shown in FIG. 2 the heating timer is connected to the current supply via a bridge rectifier $n_1$ and a transformer W. Following actuation of the switch $b$, a flip-flop circuit consisting of the transistors $T_2$ and $T_3$ is conditioned by a capacitor $C_2$ to make $T_3$ conductive. This causes the relay A to respond so that, over the relay contact a, the heating resistance $R_x$ of the welding bank is heated. Simultaneously, the capacitor $C_3$ is charged by way of the diode $n_5$ and the trimmer $P_2$, the charging time constant being adjustable by means of the aforementioned trimmer $P_2$. As soon as the capacitor $C_3$ reaches a voltage value which is higher than the emitter potential of the transistor $T_1$ as adjusted by means of the potentiometer $P_1$ by an amount equal to the potential at the diode $n_4$ and the base-emitter potential of the transistor $T_1$, the latter will become conductive, thereby resetting the flip-flop circuit. From this point on the capacitor $C_3$ is being discharged over the trimmers $P_2$ and $P_3$ and the coil resistance $R_{Sp}$ of the relay A. The discharge time constant is adjusted by means of the trimmers $P_3$.

The voltage-time function on the capacitor $C_3$ reproduces the temperature-time function on the welding bank with an accuracy that is adequate for practical purposes. Thus, it becomes possible to adjust the heater cutoff temperature on the potentiometer $P_1$ is prior thereto, the voltage-time function of the capacitor $C_3$ has been aligned on the trimmers $P_2$ and $P_3$ with the temperature-time function of the welding jaws.

The influence of fluctuations in the supply voltage is compensated for by stabilizing the emitter potential of the transistor $T_1$, but not stabilizing the charging potential of the capacitor $C_3$. This causes the response time of the heating times to vary accordingly under changes in the supply voltage.

Analogy Table

| CAPACITOR | HEATED BODY |
|---|---|
| Charging: | Heating: |
| $U_c = U_b \left(1 - e - \dfrac{t}{\tau^1}\right)$ | $\theta K = \theta E \left(1 - e - \dfrac{t}{\tau^1}\right)$ |
| $U_c$ instantaneous capacitor potential | $\theta K$ Instantaneous body temperature |
| $U_b$ charging potential | $\theta E$ body and temperature |
| $\tau_1$ charging time constant | $\tau_1$ heating time constant |
| Discharging: | Recooling: |
| $U_c = U_{co} e - \dfrac{t}{\tau^2}$ | $\theta K = \theta Ko \left(e - \dfrac{t}{\tau^2}\right)$ |
| $U_{co}$ potential at the end of charging | $\theta Ko$ temperature at the interruption of energy input |
| $\tau_2$ discharging time constant | $\tau_2$ recooling time constant |

I claim:

1. An analog timing circuit for use with a pulse type heating element such as in a welding machine comprising:
   a heating element,
   a welding bank thermally connected to said heating element, said welding bank having temperature-time characteristic functions,
   a power source electrically connected to said heating element,
   a source of potential,
   a capacitor connected to said source of potential for charging said capacitor,
   variable resistive means connected in a charging circuit path to said capacitor and said source of potential for adjusting the charging time constant of said capacitor,
   variable resistive means connected in a discharging circuit path to said capacitor and said source of potential for adjusting the discharging time constant of said capacitor,
   said capacitor charging time constant resistive means and discharging time constant resistive means defining voltage-time characteristic functions of said capacitor, said voltage-time characteristic functions of said capacitor adjusted for approximating the temperature-time characteristic functions of said welding bank, and
   electric circuit means for controlling the pulse duration from said power source to said pulse type heating element in response to the charge on said capacitor.

2. A timing circuit as recited in claim 1 wherein said source of potential varies in response to variations in voltage of said power source.

3. A timing circuit as recited in claim 1 wherein said means for controlling the pulse duration from said power source to said heating element comprises means for triggering the discharge of said capacitor at a predetermined threshold voltage level corresponding to a predetermined temperature in said heating element.

4. A timing circuit as recited in claim 1 wherein said means for adjusting the charging time constant of said capacitor is independent of said means for adjusting the discharging time constant of said capacitor.

5. A timing circuit as recited in claim 1 including means to compensate said timing circuit for variations in said power source.

6. A timing circuit as recited in claim 5 wherein said compensating means comprises a fixed threshold switch connected to said storage device and wherein said source of potential varies in proportion with said power source.

7. A timing circuit as recited in claim 1 wherein said charging and discharging means include a flip-flop circuit connected to a relay, said relay controlling current to said heating element, said capacitor device also connected to said relay whereby said heating element is heated and cools at the same rate as said storage device is charged and discharged.

* * * * *